Apr. 3, 1923.
C. F. BURROUGHS
1,450,481
HEATED MOLD FOR PLASTIC MATERIAL
Filed Jan. 4, 1921 5 sheets-sheet 1
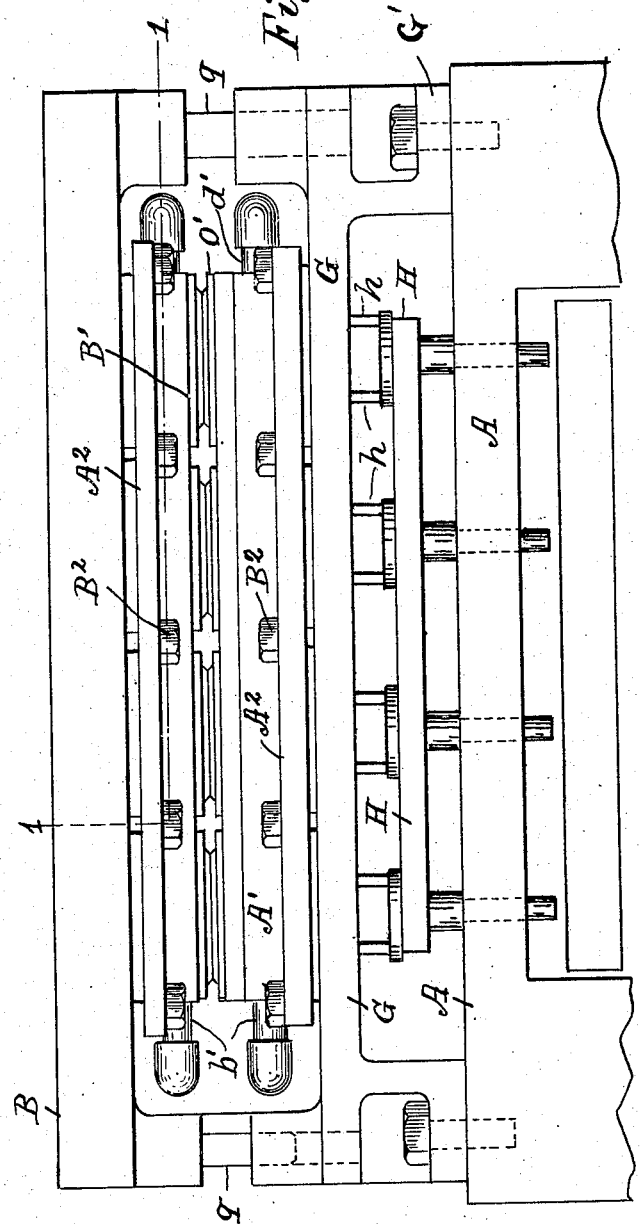
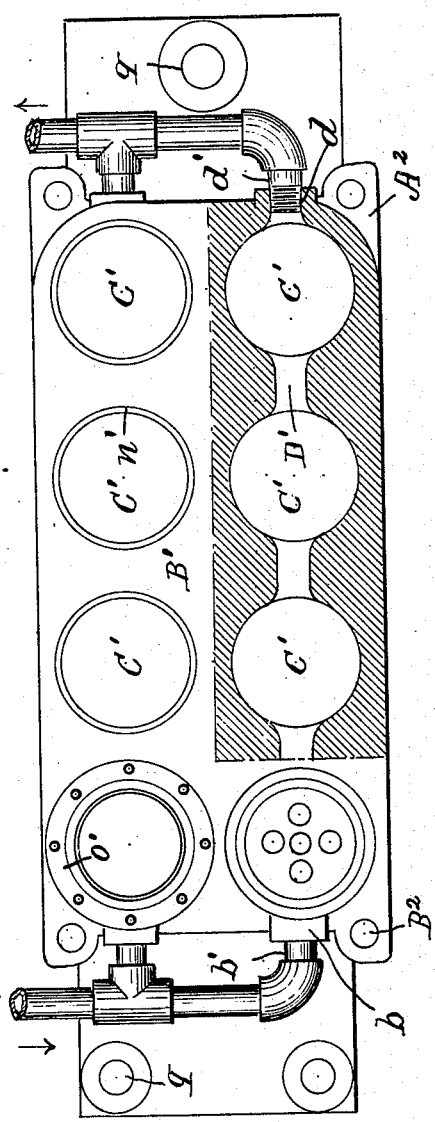
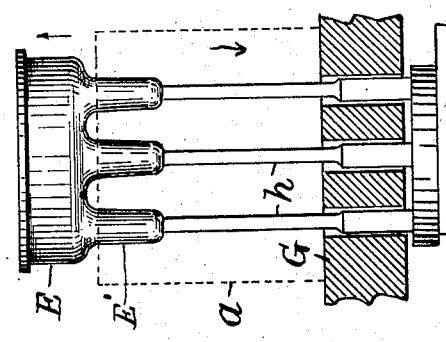

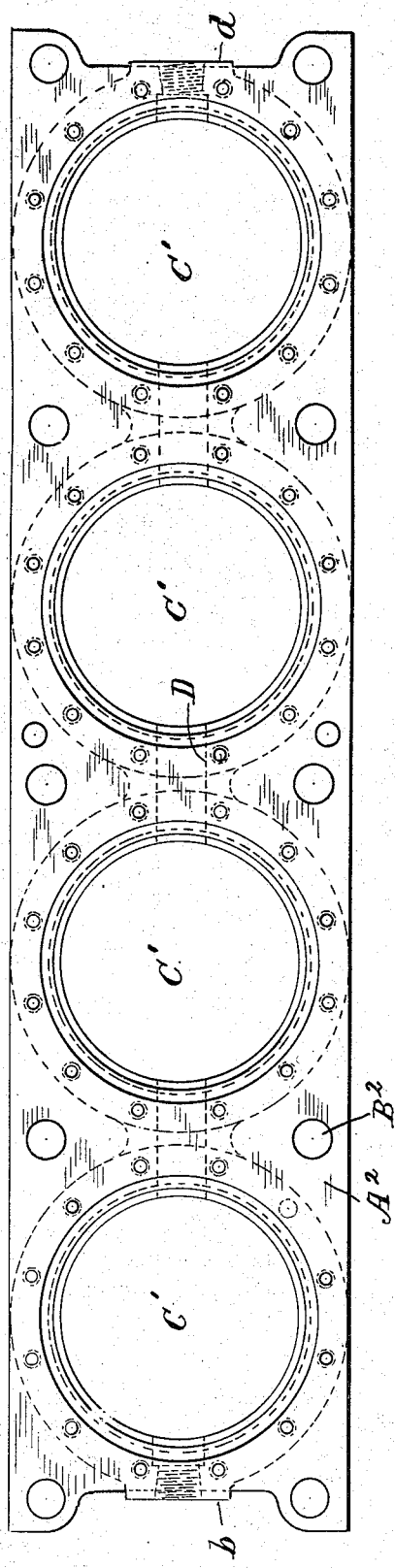
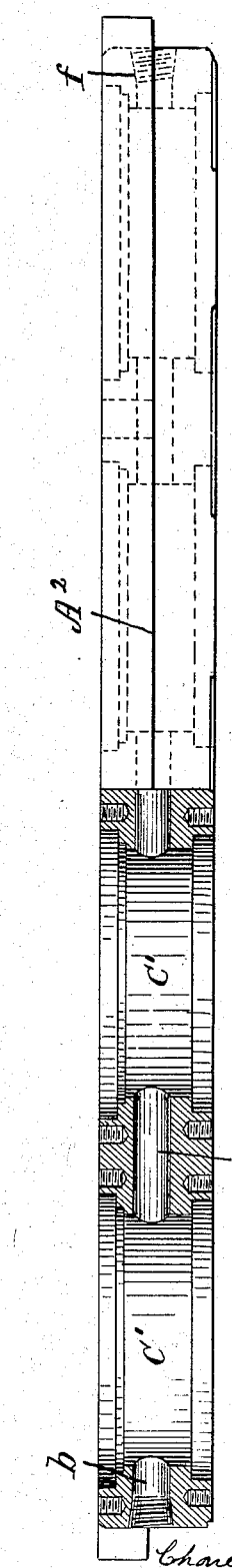

Apr. 3, 1923. 1,450,481
C. F. BURROUGHS
HEATED MOLD FOR PLASTIC MATERIAL
Filed Jan. 4, 1921 5 sheets-sheet 5

INVENTOR
Charles F. Burroughs,
per Thos. S. Crane, Atty.

Patented Apr. 3, 1923.

1,450,481

UNITED STATES PATENT OFFICE.

CHARLES F. BURROUGHS, OF EAST ORANGE, NEW JERSEY, ASSIGNOR TO COMPOSITION MACHINERY CORPORATION, OF NEWARK, NEW JERSEY, A CORPORATION OF NEW JERSEY.

HEATED MOLD FOR PLASTIC MATERIAL.

Application filed January 4, 1921. Serial No. 434,966.

*To all whom it may concern:*

Be it known that I, CHARLES F. BURROUGHS, a citizen of the United States, residing at 122 Prospect Street, East Orange, county of Essex, and State of New Jersey, have invented certain new and useful Improvements in Heated Molds for Plastic Material, fully described and represented in the following specification and the accompanying drawings forming a part of the same.

This invention relates to a means of molding plastic material by heat and pressure, such means being adapted to mold articles of any shape but particularly adapted to mold articles of cup-shape with a central cavity or recess which forms walls of determinate thickness.

The mold for molding plastic material consists essentially of two parts or sections which are termed in practice an upper die and a lower die. Each of these parts is in practice supported in a cylindrical socket, and passages formed in the socket and die for the introduction of steam and water to heat or cool the die in the molding operation.

The essential feature of the invention is the cylindrical form of the socket or sockets which are provided in the die-holders to receive cylindrical dies, such form of die and socket being more cheaply made than any other form and permitting the formation of inlet and outlet passages in the holder which direct the steam and water against the body of the die to heat and cool the same.

The dies are tightly fitted to the sockets or provided with packing to prevent any leakage of the steam and water from the socket in the holder.

A plurality of dies is sometimes mounted in a suitable holder or jacket and the upper dies connected with the head of a hydraulic, screw, or toggle-press, the lower dies of the mold being also mounted in a suitable holder or jacket and connected with the platen of a hydraulic, screw, or toggle-press so that those dies may be pressed together with a suitable charge of plastic material to form the desired article.

Such dies mounted in suitable holders are sometimes used as hand-molds, a charge of material being inserted in the dies when the mold is out of the press, the molds being then closed upon the material and inserted in the press for pressing.

The invention consists partly of means for separately heating the walls of the lower dies and upper dies, partly in means for mounting a series of dies in a suitable holder or jacket having fluid passages connecting the dies serially, and connected at the ends with inlet and outlet pipes for the heating and cooling fluid.

To facilitate the manufacture of the apparatus, the holder or jacket for the dies is formed with upper and lower parts connected respectively with the press-head and platen, and formed each with a plurality of cylindrical sockets to receive cylindrical upper and lower dies, the fitting of which parts is exceedingly easy on account of their cylindrical form.

The invention may be applied to the manufacture of articles of any shape, and is shown herein adapted to the manufacture of the distributor for the electric current in a gas-engine.

The invention includes details in the construction of the mold-parts and in the support and operation of mandrels to core out certain nozzles upon the distributor.

The invention will be understood by reference to the annexed drawing, in which Fig. 1 shows a side elevation of the holder and mold-parts connected to a platen and press-head; Fig. 2 is a plan with the press-head omitted, and parts of the upper holder broken away on line 1—1 in Fig. 1 to show the construction of the upper holder; Fig. 2ª shows the exterior of the distributor E formed in the mold with the ejector which pushes it out of the mold; Fig. 3 is a vertical central section of the mold-parts and the left-hand end of the holder adjacent thereto; Fig. 4 is a perspective view of the electric distributor formed by such molds; Fig. 5 is a side elevation of the lower die; Fig. 6 is a side elevation of the cover for the upper die with the partition carried thereby; Fig. 7 is a section of the upper die; Fig. 7ª is a plan of the base-plate G; Figs. 8 and 9 show a plan and edge view of one-half of the upper holder, one-half of the edge view showing the holder in section at the center line; Fig. 10 is a plan, and Fig. 11 an edge view of one-half of the bottom holder, one-half of the edge view showing the holder in section at the center line.

Fig. 2 shows the press-head B inverted, with the upper holder B′ having two rows of four die-sockets C′.

Figs. 8 and 10 show only one-half of each holder, so as to draw them upon a larger scale.

The opposed faces of a platen A and press-head B are shown in Fig. 1 with the lower holder A′ attached to the platen and the upper holder B′ attached to the press-head by flanges A² and bolts B² (see Fig. 1.)

Figure 10:
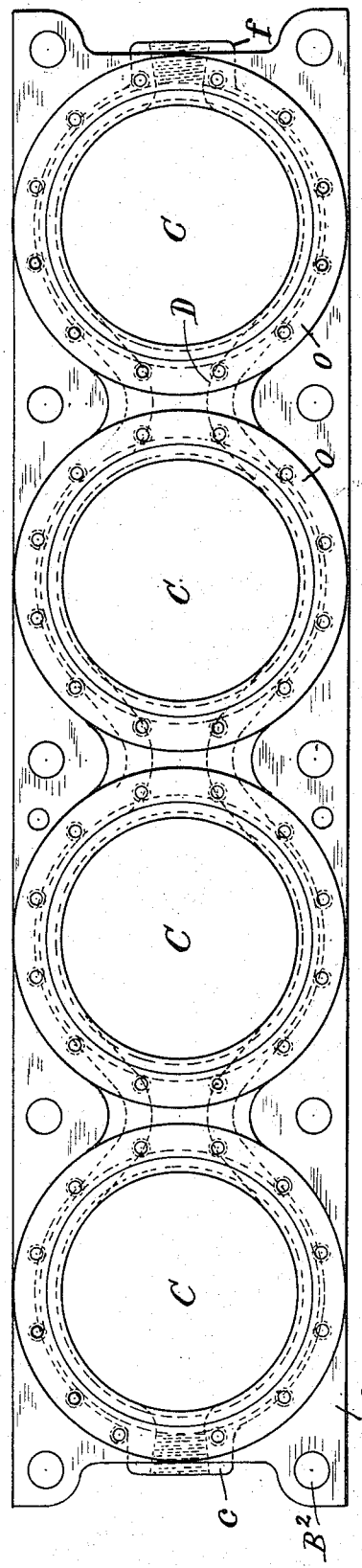
Figure 11:
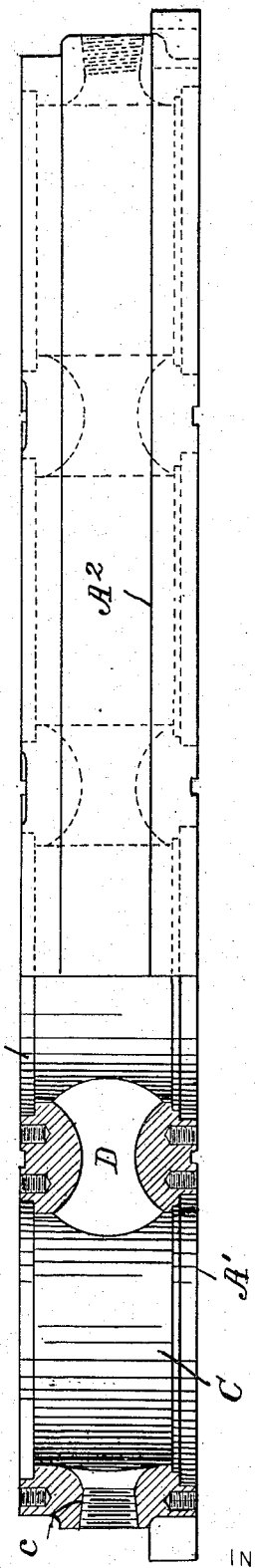

The holders are represented (see Figs. 8 and 10) each with two rows of sockets C and C′ containing four die-sockets in each row, and the sockets in each row connected by internal passages D or D′. The end passages D′ of the upper holder are provided respectively with an inlet $b$ for a supply-pipe $b'$, and an outlet $d$ provided with an outlet-pipe $d'$. (See Fig. 2).

The sockets C in the lower holder are connected by the passages D and their extreme ends provided at one end with inlet $c$ and pipe $c'$ (see left hand side of Fig. 3), and at the other end with outlet $f$ and pipe $f'$. (See Fig. 1).

These passages provide means for circulating a heating fluid around the dies for softening the material to a plastic condition, and for circulating a cooling fluid to chill the material after it is molded, before opening the mold.

Figure 3:
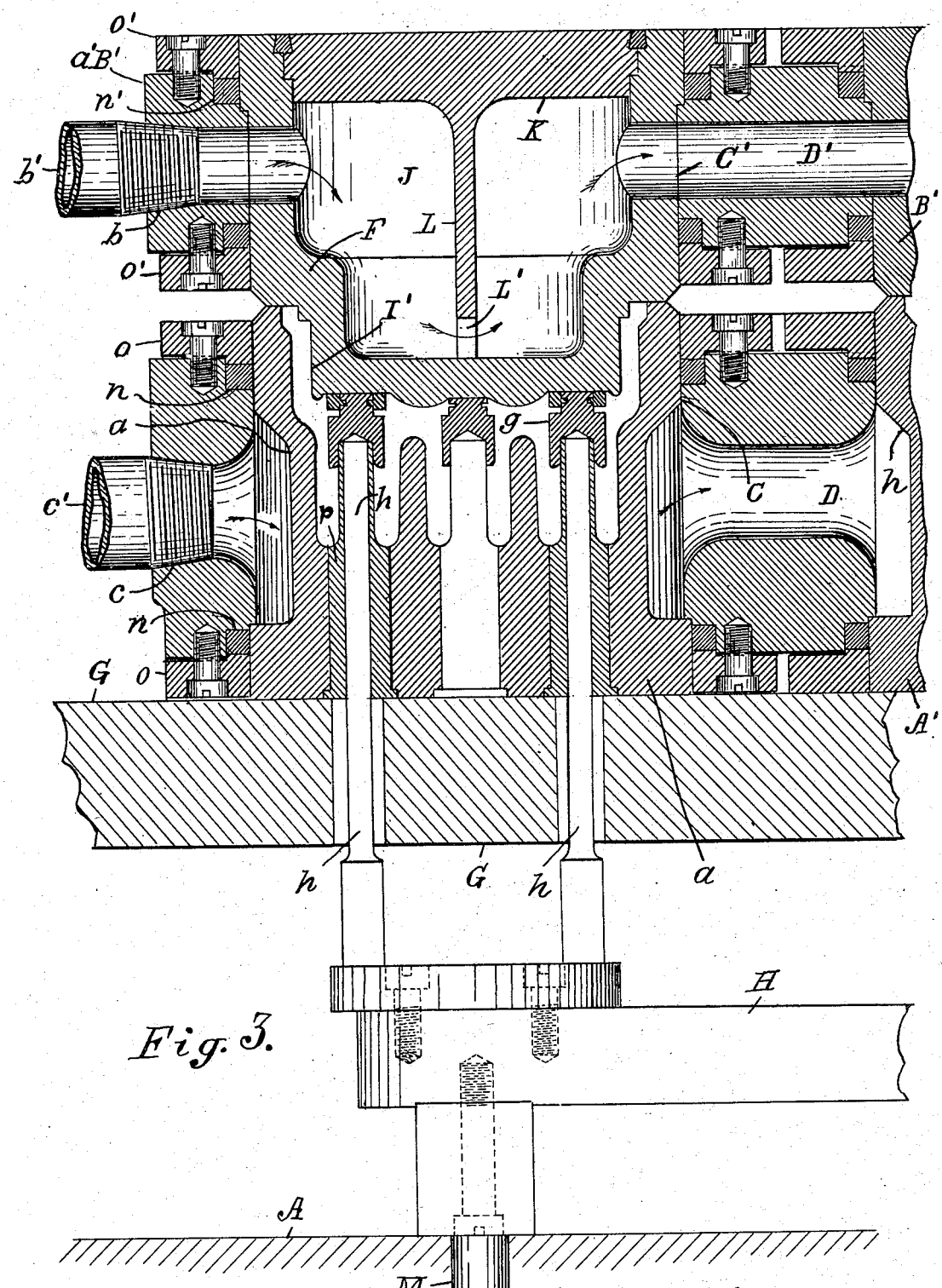

To prevent the escape of steam or cold water from the channels in which they circulate, annular packings $n$ and $n'$ are applied to the mold parts $a$ and $a'$ at the opposite side of the inlets and outlets (see Fig. 3).

These packings consist of annular gaskets laid in grooves around the sockets and held therein by glands $o$ and $o'$. (See Fig. 3). The fluid is thus confined strictly to the channels provided for them.

Figure 7:
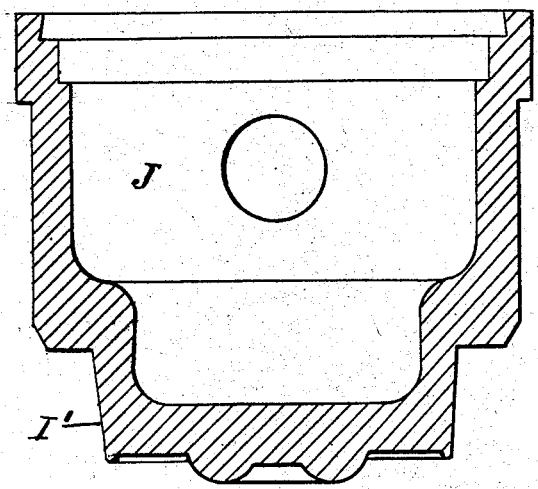
Figure 7A:
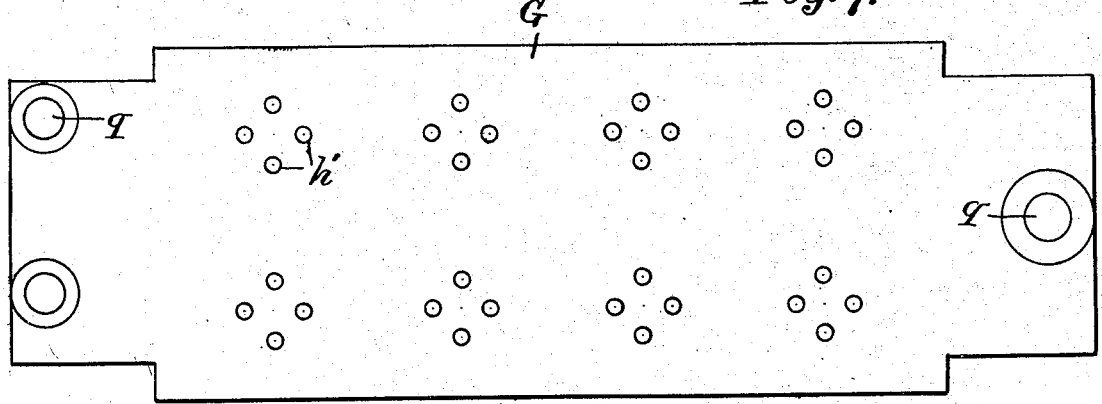

The lower holder is sustained above the platen A by a base-plate G (see Fig. 7ᵃ), which is supported upon the platen A by feet G′, as shown in Fig. 1, between which base-plate and the platen an ejector frame H is operated to actuate ejectors $h$ through the studs $p$ which give the tubular character to the nozzles upon the distributor.

Figure 5:
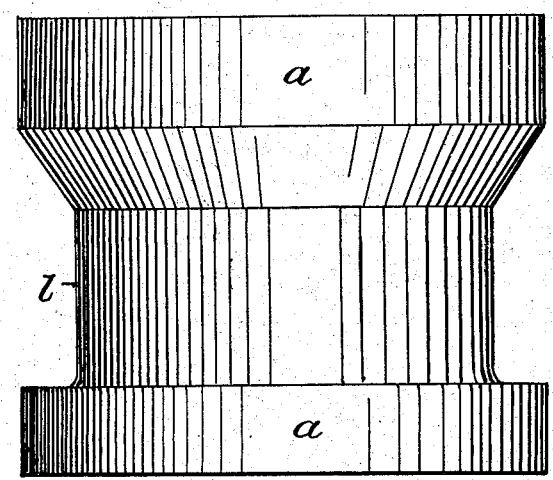
Figure 6:
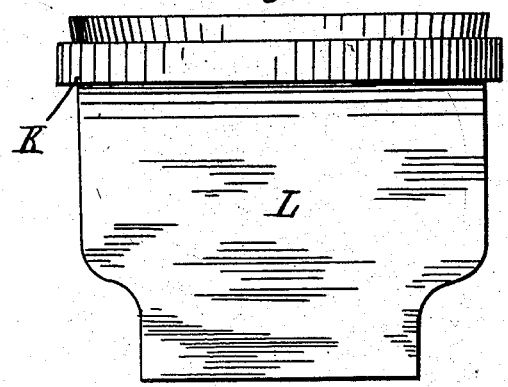

Each of the lower dies $a$ is formed, as shown in Fig. 5, with an annular channel $l$ upon its periphery in line with the inlet $c$ and the passages D which connect the several sockets (see Figs. 3 and 5).

The heating or cooling fluid entering the inlet $c$ passes around the first annular channel $l$ and circulates through all the succeeding channels and passages in the series of four dies before escaping from the outlet $f$. The die-sockets may be thus highly heated before they are charged with the material to be molded, and after the material is shaped in the mold the mold-sections may be cooled by circulating water in the channels to chill the product before the mold is opened.

Figure 4:
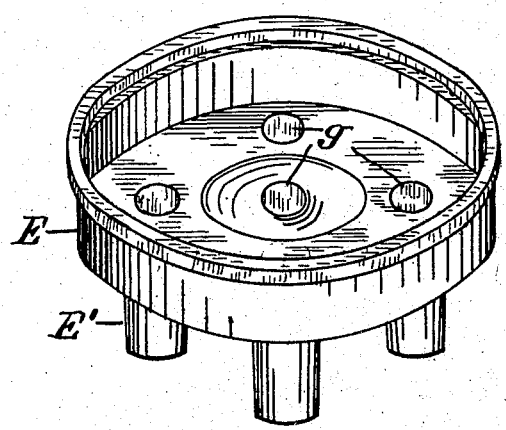

This mold is constructed to form the distributor shown in perspective in Fig. 4, which possesses a cup-shaped body E having five nozzles E′ projected from its under side, the bores of the nozzles being closed at the upper end (in the bottom of the cup) by metallic inserts $g$ which are insulated from one another by the material of the cup. (See Fig. 3).

When this distributor is in use, connections to electric wires are extended within the nozzles into contact with the inserts, to close circuits through different studs, as required.

The exterior of the distributor is molded within the lower die $a$ carried in the sockets C of the lower holder A, and the upper die $a'$ or upper half of the mold is carried in the sockets C′ of the upper holder B′. The sockets, for convenience of manufacture, are all made of the same sized bore, and are made cylindrical so that the exteriors of the lower and upper dies can be readily fitted thereto. The mold is shown empty in Fig. 3.

The lower die forms the exterior of the cup E and the nozzles E′, a portion of which nozzles with inserts at their upper ends are used to receive the impact of four ejectors $h$ when the mold-parts are separated and the removal of the molded object is desired.

The stud $g$ in the center of the lower die $a$ is solid, but the four studs $p$ surrounding the center one are tubular, within which the ejector-rods $h$ are fitted which are pushed upwardly automatically when the dies are opened.

These ejectors $h$ extend from within the studs $p$ downward through the base-plate G and rest normally upon an ejector frame H which is arranged to move vertically between the platen and the base-plate.

Such ejector frame is provided with push-rods M which extend downward through the platen, to contact with a stationary seat I² upon the press when the platen is lowered.

Such contact of the push-rods pushes the ejectors upward in relation to the mold-part supported upon the platen, and ejects the finished distributor from the lower die.

The inserts $g$ are locked into the tops of the nozzles in the molding operation, and support the upward thrust of the ejectors in pushing the distributor from the lower die.

The upper dies have a large interior hollow space or chamber J through which the heating and cooling fluid may be passed, by the inlet and outlet $b$ and $d$, and the connecting passages D′ which are clearly shown in Figs. 3 and 9.

The upper die $a'$ of the mold is formed in its lower part with a cup-shaped force or plunger I' adapted to shape the interior of the distributor.

The chamber J is closed by a cover K secured upon the top of the die with a caulking strip m, (see Fig. 1).

To divert the movement of the fluid in passing through the chambers J, a partition L is extended across the interior of the chamber, from the cover of the die nearly to the bottom of the chamber. The fluid entering the chamber at one side is thus compelled to circulate up and down within the chamber in order to pass through the opening L' beneath the partition, and the plunger I' is thus effectively heated and cooled.

Although the circulation is thus diverted it is not obstructed, but fluid entering at b passes through the series of mold-sockets and passages C to the outlet d.

The surface within this upper die is so large as to absorb the heat freely from the heating fluid, or from the die during the cooling operation.

The means for thus heating and cooling the lower and upper dies are highly efficient in producing the temperature changes desired in the mold, which range from 60 degrees to 375 degrees F. with different kinds of plastic materials.

From the above description it is evident that the means for heating and cooling a series of dies may be applied to any mold-parts that can be arranged in a series of sockets, and the latter connected by internal passages so as to circulate the heating and cooling fluids around or through the several dies successively.

It is also obvious that the use of cylindrical sockets thus connected permits dies of various shapes to be fitted interchangeably to the sockets, so that the holders may be used with molds of many different patterns.

The fitting of round dies to the sockets in a holder is quite common, and it will therefore be understood that my invention includes something more, namely, the inlet and outlet upon the socket, and the annular channel upon the periphery of the die.

Having thus set forth the nature of the invention what is claimed herein is:

1. A holder for press-molds having a cylindrical socket with inlet and outlet upon its sides, and a die having cylindrical body fitted to such socket and having an annular channel upon the exterior of the body connecting with the inlet and outlet, and annular packings at opposite sides of such channel preventing leakage from the socket.

2. A holder for press-molds having a cylindrical socket with inlet and outlet upon its sides, and a die having cylindrical body fitted to such socket and having an annular channel upon the exterior of the body connecting with the inlet and outlet, annular grooves in the walls of the socket above and below the inlet and outlet, and yielding packings fitted to such grooves and to the periphery of the mold to prevent leakage from the socket.

3. A holder for press-molds having a cylindrical socket with inlet and outlet upon its sides, and a die having cylindrical body fitted to such socket and having an yielding annular channel upon the exterior of the body connecting with the inlet and outlet, annular grooves in the walls of the socket above and below the inlet and outlet, and yielding packings fitted to such grooves, one side of each groove being adjustable to form a gland for the said packing.

4. Complementary holders for press-molds, having cylindrical sockets to receive the lower die and upper die of a mold each socket having inlet and outlet upon its sides, a cylindrical lower die and upper die fitted respectively to the said sockets, each having a fluid inlet and outlet communicating with the inlet and outlet upon the respective sockets, and yielding annular packings at opposite sides of such inlets and outlets preventing leakage from the sockets.

5. The combination, with a holder having cylindrical socket, of a cup-shaped upper die fitted externally to such socket, the upper die and holder having passages forming a fluid-inlet and outlet, a cover for the cavity of the upper die, and a partition carried by the cover and extended toward the bottom of the upper die between the inlet and outlet to divert the circulation of fluid through the upper die.

6. The combination, with a holder having a cylindrical socket, of a cup-shaped upper die fitted externally to such holder, the upper die and holder having coincident passages forming a fluid-inlet and outlet, a cover for the cavity of the upper die, with caulked metal ring at its peripheral joint with the cavity of the upper die, and a partition extended downward from the cover toward the bottom of the cup between the inlet and outlet to divert the circulation therethrough.

7. The combination, with a press-platen and head, of upper and lower die-holders provided with cylindrical sockets for a plurality of dies, passages connecting the sockets in series with a fluid-inlet and outlet at the ends of the series, cylindrical die-sections fitted respectively to the sockets in the upper and lower holders, fluid-passages in all of such die-sections connecting with the serial passages in the holders, the sockets having annular packings fitted to the die-sections to prevent leakage from the sockets, and the die-sections in the sockets contacting respectively with the platen and the head of the press.

8. The combination, with a press-platen and head, of a holder for press-molds having a cylindrical socket divided transversely to receive the lower die and upper die of a mold, each part of the socket having inlet and outlet upon its sides, a cylindrical lower die and upper die fitted respectively to the bores of such sockets, and having fluid connections to the inlet and outlet-passages, the lower die having a cup-shaped recess, a plurality of ejectors extended through the platen and the bottom of the lower die into the said cup-shaped recess, a seat supporting the ejectors and means for retracting the seat to withdraw the ejectors from the recess in the mold-body.

9. In a distributer molding press, the combination, with a press-platen and head, of a holder for press-molds having a cylindrical socket divided transversely to receive the lower die and upper die of a mold, each part of the socket having inlet and outlet upon its side, cylindrical upper and lower dies fitted respectively to the bores of such sockets, and having fluid connections to the inlet and outlet-passages, the lower die having a cup-shaped recess with a plurality of bores to form nozzles upon the molded distributor, ejectors one for each or part of the said bores extended through the platen and the bottom of the lower die into the said bores with clearance to form the walls of the nozzles, and means for retracting the ejectors when the distributor is molded.

In testimony whereof I have hereunto set my hand.

CHARLES F. BURROUGHS.